US009788213B1

(12) United States Patent
Nicholas et al.

(10) Patent No.: US 9,788,213 B1
(45) Date of Patent: Oct. 10, 2017

(54) METHOD FOR INTERFERENCE-ROBUST TRANSMITTER PLACEMENT IN WIRELESS MESH NETWORKS

(71) Applicant: The United States of America, as represented by the Secretary of the Navy, Washington, DC (US)

(72) Inventors: Paul J. Nicholas, Stafford, VA (US); David L. Alderson, Monterey, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 93 days.

(21) Appl. No.: 14/979,836

(22) Filed: Dec. 28, 2015

Related U.S. Application Data

(60) Provisional application No. 62/097,938, filed on Dec. 30, 2014.

(51) Int. Cl.
*H04W 16/18* (2009.01)
*H04W 64/00* (2009.01)
(Continued)

(52) U.S. Cl.
CPC .............. *H04W 16/18* (2013.01); *H04K 3/20* (2013.01); *H04W 64/003* (2013.01); *H04W 84/18* (2013.01)

(58) Field of Classification Search
CPC . H04W 16/18; H04W 64/003; H04W 64/006; H04W 84/12; H04W 84/18; H04K 3/20–3/28; H04K 2203/32
See application file for complete search history.

(56) References Cited

U.S. PATENT DOCUMENTS 8,654,672 B1    2/2014  Nicholas et al.
2014/0057638 A1*  2/2014  Carey ................... H04W 16/18
                                                                  455/446

OTHER PUBLICATIONS

Nicholas, P., Optimal transmitter placement in wireless mesh networks, (masters thesis, Naval Postgraduate School, 2009).
(Continued)

*Primary Examiner* — Pao Sinkantarakorn
(74) *Attorney, Agent, or Firm* — Naval Postgraduate School; James B. Potts (57) ABSTRACT

The disclosure provides a computer-implemented system for establishing a wireless mesh network resistant to degradation induced by deliberate jamming or other electromagnetic interference emanating from point sources within an operating area. The computer-implemented system provides WMN AP locations that minimize disruptions to client coverage caused by jammers, subject to constraints on network service. The computer-implemented system considers jammers placed by an intelligent adversary and identifies the AP locations $\lambda$ through quantification of an objective function of the general form $Z(\lambda,\chi) = Z_{coverage}(\lambda,\chi) - w\, Z_{flow}(\lambda,\chi)$, where $Z_{coverage}(\lambda,\chi)$ reflects resulting coverage shortfall, $Z_{flow}(\lambda,\chi)$ reflects traffic flow within the WMN, and w is a scalar reflecting the relative weight of the two terms. The final set of AP locations $\lambda$ identifies the locations of APs to create a WMN that is the most robust to the worst possible jamming attack. Such an attack could represent the actions of a rational human opponent, or the worst-case positioning of unintentional interference sources such as civilian radios, other RF devices, or high-voltage electrical devices.

16 Claims, 6 Drawing Sheets

(51) Int. Cl.
 H04K 3/00 (2006.01)
 H04W 84/18 (2009.01)

(56) References Cited

OTHER PUBLICATIONS

Wood et al., JAM: A jammed-area mapping service for sensor networks, Proceedings of the 24th IEEE International Real-Time Systems Symposium (RTSS'03) (2003).
Ku et al., The feasibility of launching and detecting jamming attacks in wireless networks, MobiHoc 05 (2005).
Ståhlberg, Radio jamming attacks against two popular mobile networks, Seminar on Network Security, (2002).
Lazos et al, "Selective jamming/dropping insider attacks in wireless mesh networks." IEEE Network, 25(1) (2011).
Xu et al., On adjusting power to defend wireless networks from jamming. Proceedings of the 1st ACM Conference on Wireless Security, (2008).
Wood et al., DEEJAM: Defeating energy-efficient jamming in IEEE 802.15.4-based wireless networks. 4th Annual IEEE Communications Society Conference on Sensor, Mesh, and Ad Hoc Communications and Networks, (2007).
Xu et al., Channel surfing and spatial retreats: defenses against wireless denial of service, Proceedings of 3rd ACM Workshop on Wireless Security (2004).
Ma et al., Mobile network management and robust spatial retreats via network dynamics, Mobile Adhoc and Sensor Systems Conference, 2005 (2005).
Thamilarasu et al., Game theoretic modeling of jamming attacks in ad hoc networks, Proceedings of the 18th International Conference on Computer Communications and Networks, (2009).
Shankar, Optimal jammer placement to interdict wireless network services, (masters thesis, Naval Postgraduate School, 2008).
Alderson et al., Solving Defender-Attacker-Defender Models for Infrastructure Defense, 12th INFORMS Computing Society Conference (2011).
Nicholas et al., "Fast, Effective Transmitter Placement in Wireless Mesh Networks," Military Operations Research, V17 N4 (2012).

* cited by examiner

FIG. 14
Coverage shortfall = 153332 dB
Network flow = 76 kbps

FIG. 13
Coverage shortfall = 164641 dB
Network flow = 41 kbps

FIG. 12
Coverage shortfall = 109 dB
Network flow = 1121 kbps

METHOD FOR INTERFERENCE-ROBUST TRANSMITTER PLACEMENT IN WIRELESS MESH NETWORKS

CROSS-REFERENCE TO RELATED PATENT APPLICATIONS

This application is a non-provisional application of and claims priority to U.S. Patent Application 62/097,938, filed on Dec. 30, 2014, which is hereby incorporated by reference in its entirety.

BACKGROUND

1. Field of the Invention

The present invention relates generally to communications systems and particularly to wireless mesh networks. Still more particularly, the invention relates to a computer-implemented system for quickly and particularly designing a wireless mesh network to maximize robustness against jamming attacks by an intelligent adversary.

2. Description of the Related Art

Wireless mesh networks (WMNs) are interconnected systems of wireless access points (APs) that provide untethered network connectivity for a group of users that require data, voice, and/or video communication. Each AP has two radio devices: the first connects to local client devices, such as laptops and portable digital assistants (PDAs); the second connects to other APs to create a backhaul network. Communication between users on a WMN passes from a source client through one or more APs before reaching a destination client. To function, APs require only a local power source, such as a battery or portable generator. This property of WMNs make them well-suited to operations in austere environments, such as combat and humanitarian assistance disaster relief (HA/DR) operations. For an introduction to WMNs see Nicholas, P., "Optimal transmitter placement in wireless mesh networks," (masters thesis, Naval Postgraduate School, 2009).

The wireless access medium of a WMN makes it particularly vulnerable to attack and exploitation. Such actions may include passive eavesdropping and packet capture, spoofing trusted identities to gain unauthorized access to the network, injecting malicious code, or denial of service (DoS) attacks. During physical-layer noise jamming DoS attacks, an attacker constantly broadcasts noise on the same radio frequency used by the WMN in an attempt to overpower the friendly signal, degrading or denying use of the channels. Powerful commercial and military jamming systems are readily available, but this type of attack can be conducted with inexpensive equipment and little technological prowess, and can be very challenging to defend against. Even unintentional interference can be as harmful as an intentional attack. Hence it is of increasing concern in both civilian and military operating environments.

There has been much recent research in defending WMNs from attack. Some approaches describe a method of mapping the areas affected by physical layer jamming to avoid placing sensors in these denied areas, or rely on algorithms to improve the classification rate of jamming attacks. See Wood et al., JAM: A jammed-area mapping service for sensor networks, Proceedings of the 24th IEEE International Real-Time Systems Symposium (RTSS'03) (2003), and see Xu et al., The feasibility of launching and detecting jamming attacks in wireless networks, MobiHoc 05 (2005). Others increase the robustness of wireless networks to attacks, including the use of directional antennae, frequency hopping and spread spectrum technology, lower data rates, fiber-optic backhaul networks, encryption and error correction, frequency-agile control channels, and adjustment of transmission power, but do not specifically consider defensive placement or mobility of APs. See Ståhlberg, Radio jamming attacks against two popular mobile networks, Seminar on Network Security, (2002); see also Lazos et al, Selective jamming/dropping insider attacks in wireless mesh networks. *IEEE Network*, 25(1) (2011); see also Xu et al., On adjusting power to defend wireless networks from jamming. Proceedings of the $1_{st}$ ACM Conference on Wireless Security, (2008); see also Wood et al., DEEJAM: Defeating energy-efficient jamming in IEEE 802.15.4-based wireless networks. $4_{th}$ Annual IEEE Communications Society Conference on Sensor, Mesh, and Ad Hoc Communications and Networks, (2007). Others examine spatial retreats, i.e., moving APs physically away from the sources of interference, as a form of defense against a jamming attack, assume that jammers are stationary, and minimize the damage done by coordinating the retreat of APs from the effective range of the adversary's jammers. However, they also fail to consider jammers that could then move and attack the newly-configured network. See Xu et al., Channel surfing and spatial retreats: defenses against wireless denial of service, Proceedings of 3rd ACM Workshop on Wireless Security (2004); see also Ma et al., Mobile network management and robust spatial retreats via network dynamics, Mobile Adhoc and Sensor Systems Conference, 2005 (2005).

Some investigations have utilized game theory to model optimal jamming attack and detection strategies, but have considered only strategic-form games wherein players move simultaneously, rather than extensive form games wherein players move sequentially. See Thamilarasu et al., Game theoretic modeling of jamming attacks in ad hoc networks, Proceedings Of the $18_{th}$ International Conference on Computer Communications and Networks, (2009). Others have similarly considered the deliberate placement of jammers by an intelligent adversary (called the attacker) to maximally disrupt network operation, but have not investigated a continuous space for jammer placement (and therefore an infinite number of possible locations). See Shankar, Optimal jammer placement to interdict wireless network services, (Master's Thesis). Monterey, Calif.: Naval Postgraduate School (2008).

Presented here is a computer-implemented system for forming robust wireless mesh networks in environments where jamming is expected. Unlike previous efforts focusing on static or random jamming, the computer-implemented system disclosed considers WMN network design in the presence of an intelligent adversary who observes the network and then places jammer(s) to maximally disrupt network performance. In this way, the computer implemented system provides network designs which maximize robustness to the worst possible jamming attack, rather than defending against a specific one.

These and other objects, aspects, and advantages of the present disclosure will become better understood with reference to the accompanying description and claims.

SUMMARY

The disclosure provides a computer-implemented system for establishing a wireless mesh network (WMN) resistant to degradation induced by deliberate jamming or other electromagnetic interference (EMI) emanating from point sources within an operating area. The computer-implemented system provides WMN Access Point (AP) locations that minimize disruptions to client coverage caused by jammers, subject to constraints on network service. The computer-implemented system comprises a computer-based apparatus which considers network design in the presence of an intelligent adversary capable of observing the WMN and placing jammers to maximally disrupt coverage, rather than merely considering static or random jamming.

The computer implemented system comprises a computer-based apparatus which provides AP locations within a geographic area by successively analyzing AP locations $\lambda$ and jammer locations $\chi$ through quantification of an objective function having the general form $Z(\lambda,\chi)=Z_{coverage}(\lambda,\chi)-w\ Z_{flow}(\lambda,\chi)$, where $Z_{coverage}(\lambda,\chi)$ reflects resulting coverage shortfall within the geographic area for a given $\lambda$ and a given $\chi$, $Z_{flow}(\lambda,\chi)$ reflects and traffic flows within the geographic area for the given $\lambda$ and the given $\chi$, and w is a scalar reflecting the relative weight of the two terms. The computer-based apparatus employs a nested analysis by selecting an initial set of AP locations $\lambda$, then iteratively analyzing selected jammer locations $\chi$ against the initial set of AP locations $\lambda$ using the physical characteristics of the geographic area, selected technical specifications of the WMN, and quantification of the objective function $Z(\lambda,\chi)$. Upon completing this inner loop, the computer-based apparatus returns to the outer loop to select a subsequent set of AP locations $\lambda$, and repeats the inner loop analysis to determine the most disruptive jammer locations $\chi$ for the subsequent set of AP locations $\lambda$. This process repeats until selected stopping criterion are satisfied. At the conclusion of the process, the computer-based apparatus provides the final set of AP locations $\lambda$ which most effectively counters the most disruptive set of jammer locations $\chi$ located during the iterative process. The final set of AP locations $\lambda$ thereby identifies the locations of APs to create a WMN that is the most robust to the worst possible jamming attack identified. Such an attack could represent the actions of a rational human opponent, or the worst-case positioning of unintentional interference sources such as civilian radios, other radio frequency (RF) devices, or high-voltage electrical devices.

In a particular embodiment, stopping criteria for the inner and outer loops are based on a specified number of iterations. In another embodiment, the stopping criteria is based on the difference between quantified objective functions in successive iterations. In a further embodiment, the computer-based apparatus selects the subsequent set of AP locations $\lambda$ based on minimizing the impact of the most maximally disruptive set of $\chi$ yet encountered in the process, and utilizing that $\lambda$ configuration as the subsequent set of AP locations $\lambda$.

In some embodiments, the computer-implemented system further comprises a two-dimensional display in data communication with the computer-based apparatus, and provides graphic representation of the operating area and the resultant final set of AP locations $\lambda$. In another embodiment, the two-dimensional display provides the discrete coverage regions within the operating area, and provides the coverage shortfalls expected for the final set of AP locations $\lambda$ given the maximally disruptive jammer placement.

Embodiments in accordance with the invention are best understood by reference to the following detailed description when read in conjunction with the accompanying drawings.

Embodiments in accordance with the invention are further described herein with reference to the drawings.

DETAILED DESCRIPTION

The disclosure provides a computer-implemented system for establishing a wireless mesh network (WMN) resistant to degradation induced by deliberate jamming or other electromagnetic interference (EMI) emanating from point sources within an operating area. The computer-implemented system may generally be employed against any form of WMN interference in which network performance is a function of the distance between interference sources and WMN Access Points (APs), and provides AP locations that minimize the disruption to client coverage caused by jammers, subject to constraints on network service and considering the effects of radio propagation over terrain. The computer-implemented system utilizes a process which considers network design in the presence of a simulated intelligent adversary capable of observing the WMN and placing jammers to maximally disrupt coverage.

The computer implemented system comprises a computer-based apparatus which provides AP locations based on inputs including selected inherent technical characteristics of APs and jammers within the WMN, the characteristics of the geographic area within which the WMN will operate, and others. The computer-based apparatus acts to analyze successive AP locations $\lambda$ and jammer locations $\chi$ placed within the operating area by formulating an objective function having the general form $Z(\lambda,\chi)=Z_{coverage}(\lambda,\chi)-w\ Z_{flow}(\lambda,\chi)$, where $Z_{coverage}(\lambda,\chi)$ reflects resulting coverage shortfall within the geographic area for a given $\lambda$ and a given $\chi$, $Z_{flow}(\lambda,\chi)$ reflects and traffic flows within the geographic area for the given $\lambda$ and the given $\chi$, and w is a scalar reflecting the relative weight of the two terms. Details and quantification of the objective function $Z(\lambda,\chi)$ are further discussed below. The computer-based apparatus provides an optimized set of AP locations $\lambda$ by initially selecting a set of AP locations λ, where individual $\lambda_i$ in the set may be any location within the operating area, and may be selected using any methodology. Having defined a set of AP locations λ, the computer-based apparatus evaluates the objective function over multiple iterations in order to locate a set of jammer locations χ within the operating area which most disrupts the WMN established by the set of AP locations λ, based on resulting the value of the objective function Z(λ,χ). Once the most disruptive set of χ for the current set of λ is located, the computer-based apparatus selects a subsequent set of AP locations λ and conducts similar analysis of the objective function to locate a second set of jammer locations χ for maximal disruption of the new WMN established by the subsequent set of AP locations λ. In a particular embodiment, the computer-based apparatus selects the subsequent set of AP locations λ based on minimizing the impact of the most disruptive set of χ yet encountered in the process, and utilizing that λ configuration as the subsequent set of AP locations λ. The methodology continues in this fashion until stopping criterion are met. At the conclusion of the process, the computer-based apparatus provides a final set of AP locations λ which most effectively counters the most disruptive set of jammer locations χ located during the iterative process. The final set of AP locations λ thereby identifies the locations of APs to create a WMN that is the most robust to the worst possible jamming attack encountered. Such an attack could represent the actions of a rational human opponent, or the worst-case positioning of unintentional interference sources such as civilian radios, other RF devices, or high-voltage electrical devices.

In a particular embodiment, the computer-implemented system further comprises a two-dimensional display in data communication with the computer-based apparatus which provides graphic representation of the operating area and the resultant final set of AP locations λ. In another embodiment, the two-dimensional display provides discrete coverage regions within the operating area, and coverage shortfalls expected for the final set of AP locations λ given the maximally disruptive jammer placement.

Calculating the Value of a WMN Topology:

The computer-based apparatus employs a methodology for calculating the value of a WMN physical topology given fixed AP and jammer locations. See Nicholas et al., "Fast, Effective Transmitter Placement in Wireless Mesh Networks," *Military Operations Research*, 17(4) (2012); see also U.S. Pat. No. 8,654,672 issued to Nicholas et al., issued Feb. 18, 2014. N is defined to be the set of all AP nodes, indexed by i=1, 2, . . . , n, where n=|N|. M is defined to be the set of all jammer nodes, indexed by k=1, 2, . . . , m, where m=|M|. Let $\lambda=(\lambda_1, \lambda_2, \ldots \lambda_n)$ represent the locations of the APs, and let $\chi=(\chi_1, \chi_2 \ldots \chi_m)$ represent the locations of the jamming sources. The operating area is the topographic area where an AP i or jamming source k may be physically located. A two-dimensional coordinate (x, y) is associated with each location $\chi_i$ and with each $\chi_k$; these coordinates represent the northing and easting for AP node i and each jammer node k, respectively. The APs and jammers, once placed, generally remain stationary. The operating area is divided into a set of discrete coverage regions R, indexed by r=1, 2, . . . |R|. The formulation allows the use of any discretization scheme, however generally the implementation assumes rectangular regions arranged in a grid. Each coverage region r∈R may have an associated elevation. In some embodiments, the elevation is assumed to be uniform throughout the region. This assumption is not true in practice, but is consistent with much of the available elevation data. See P. J. Nicholas and D. L. Alderson, "Designing interference-robust wireless mesh networks using a defender-attacker-defender model," Naval Postgraduate School, Monterey, Calif., Tech. Rep. NPS-OR-15-002 (2015).

Figure 1:
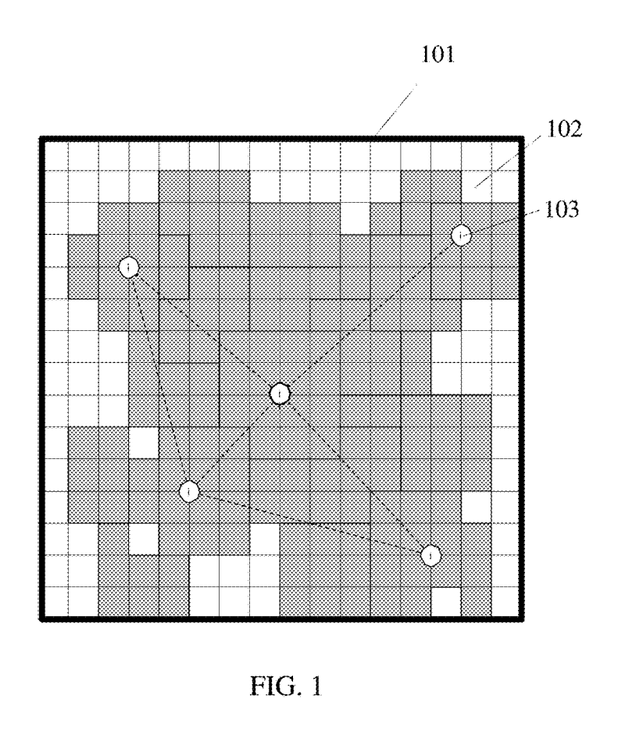
FIG. 1 illustrates a WMN placed within an operating area.
Figure 2:
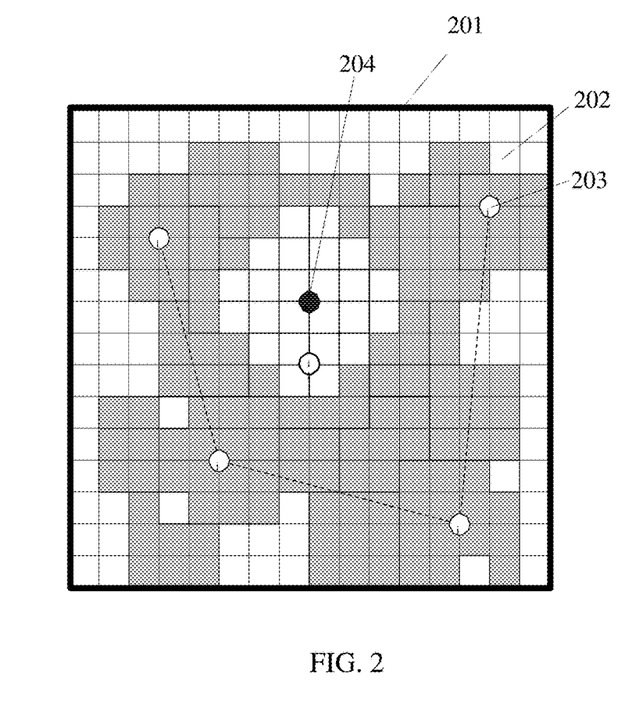
FIG. 2 illustrates a WMN and jammers placed within an operating area.

FIG. 1 illustrates an operating area 101 having discrete coverage regions such as 102, a wireless mesh network comprising AP locations such as AP location 103. FIG. 1 depicts a typical WMN in the absence of jamming. AP nodes are illustrated as white circles, and shaded grid elements represent locations that receive sufficient client coverage from the APs. The coverage obtained at each grid location depends on several factors including the local terrain, AP and client radio characteristics, and EMI. The dashed lines in FIG. 1 represent the backhaul network used to communicate between AP nodes. FIG. 2 illustrates the operating area as 201 with discrete coverage regions such as 202, AP locations such as AP location 203, and operating in the presence of a jammer 204. As illustrated, the placement of a jammer, denoted by a black circle, decreases client coverage and disrupts backhaul network connectivity. Each jammer node k∈M may have two active transmitters: one interfering with nearby AP client coverage radios and the other interfering with nearby AP backhaul network radios. Generally, the APs are not subject to self-jamming or interference from other APs, and jammers emit signals consisting of random noise perfectly matched in frequency, phase, and polarization to AP transmissions (i.e., perfect physical-layer interference). See e.g. Pelechrinis et al., "Denial of service attacks in wireless networks: The case of jammers," *IEEE Communications Surveys & Tutorials*, 13(2) (2011).

Each AP node i∈N may serve as a source of network traffic. Sink or destination nodes d∈N are identified as the sinks for all network traffic. Generally all APs serve as destination nodes, as is common in peer-to-peer networks. Typically, the physical location of one destination node, designated the headquarters (HQ) node, is known in advance and fixed. This node may serve as the network gateway and/or location of domain controllers and servers. This is consistent with reality, where network designers must place an AP at their headquarters, satellite gateway, or Internet point of presence (PoP).

Quantifying the value of a particular WMN topology in the presence of EMI is conducted by calculating two subproblems: the value of coverage provided to client devices $Z_{coverage}$, and the value of delivered backhaul network flow $Z_{flow}$. The value of the given WMN topology is given by the linear combination:

$$Z(\hat{\lambda},\hat{\chi})=Z_{coverage}(\hat{\lambda},\hat{\chi})-w\, Z_{flow}(\hat{\lambda},\hat{\chi}), \quad (1)$$

where w is a positive scalar representing the relative importance of network flow, and the ^ symbol denotes that the locations λ and χ are fixed.

Given fixed AP locations $\hat{\lambda}$ and fixed jammer locations $\hat{\chi}$, the operator $\underline{D}$ aims to minimize client coverage shortfall and minimize negative network flow (i.e., maximize positive network flow) by choice of flow variables S, F, T, and P. For clarity, the variables being minimized by the operator $\underline{D}$ are explicitly stated in the operator's problem:

$$Z_{\underline{D}}(\hat{\lambda}, \hat{\chi}) = \min_{S,F,T,P} \left( Z_{coverage}(\hat{\lambda}, \hat{\chi}) - wZ_{flow}(\hat{\lambda}, \hat{\chi}, S, F, T, P) \right) \quad (2)$$

Placing Jammers:

The attacker A, given fixed AP node locations $\hat{\lambda}$, wishes to maximize disruption to the WMN by placing jammer nodes at locations:

$$DA\underline{D}(\hat{\lambda}, \cdot, \cdot) : Z_{A\underline{D}}(\hat{\lambda}) = \max_{\chi} \min_{S,F,T,P} (Z_{coverage}(\hat{\lambda}, \chi) - wZ_{flow}(\hat{\lambda}, \chi, S, F, T, P)) \quad (3)$$

The attacker's objective is to maximize coverage shortfall and minimize delivered backhaul network flow.

The network designer D, given fixed jammer node locations $\hat{\chi}$, wishes to maximize WMN performance by placing AP nodes at locations $\lambda$:

$$Z_{D\underline{D}}(\hat{\chi}) : \min_{\lambda} \min_{S,F,T,P} (Z_{coverage}(\lambda, \hat{\chi}) - wZ_{flow}(\lambda, \hat{\chi}, S, F, T, P)) \quad (4)$$

The designer's objective is to minimize coverage shortfall and maximize delivered backhaul network flow.

The DAD Problem:

The computer-based apparatus nests the problems of the operator, attacker, and designer to utilize an overall SRRA+C DA$\underline{D}$ formulation:

$$Z_{DA\underline{D}} = \min_{\lambda} \max_{\chi} \min_{S,F,T,P} (Z_{coverage}(\lambda, \chi) - wZ_{flow}(\lambda, \chi, S, F, T, P)) \quad (5)$$

In the specific operation of the computer-based apparatus, the designer D first chooses AP locations $\lambda$, which the attacker A then aims to maximally disrupt by placing jammers at locations $\chi$. The operator D calculates client coverage and determines how to route traffic given AP and jammer locations. The solution to the DA$\underline{D}$ problem indicates where the network designer should place APs to minimize the worst-case disruption possible by EMI. That is, when solved to optimality, the obtained AP network topology is completely immune to greater degradation, as the attacker cannot possibly do more damage.

Solving the DAD Problem:

To solve the SRRA+C DA$\underline{D}$ problem, the computer-based apparatus decomposes the DA$\underline{D}$ problem into a designer D master problem with separate attacker A subproblems. See e.g. Alderson, D. L., Brown, G. G., Carlyle, W. M., & Wood, R. K. (2011). Solving defender-attacker-defender models for infrastructure defense. In R. K. Wood & R. F. Dell (Eds.), *Operations Research, Computing, and Homeland Defense* (pp. 28-49). Hanover, Md.: INFORMS. In the master problem, the computer-based apparatus chooses AP locations $\lambda_u$ for each iteration u=1, 2, . . . , max_master_iterations. For those given AP locations, the associated subproblem chooses jammer locations $\chi_v$ for each iteration v=1, 2, . . . , max_sub_iterations. Given AP locations $\lambda_u$ and jammer locations $\chi_v$, the overall objective value is then obtained via solving the operator's problem (2). After max_sub_iterations, the subproblem returns the jammer locations $\hat{\chi}$ yielding the best attack found (i.e., the highest overall objective value). The master problem continues searching for the best AP locations $\lambda^*$ to minimize the damage caused by the worst attack found until max_master_iterations.

Figure 3:
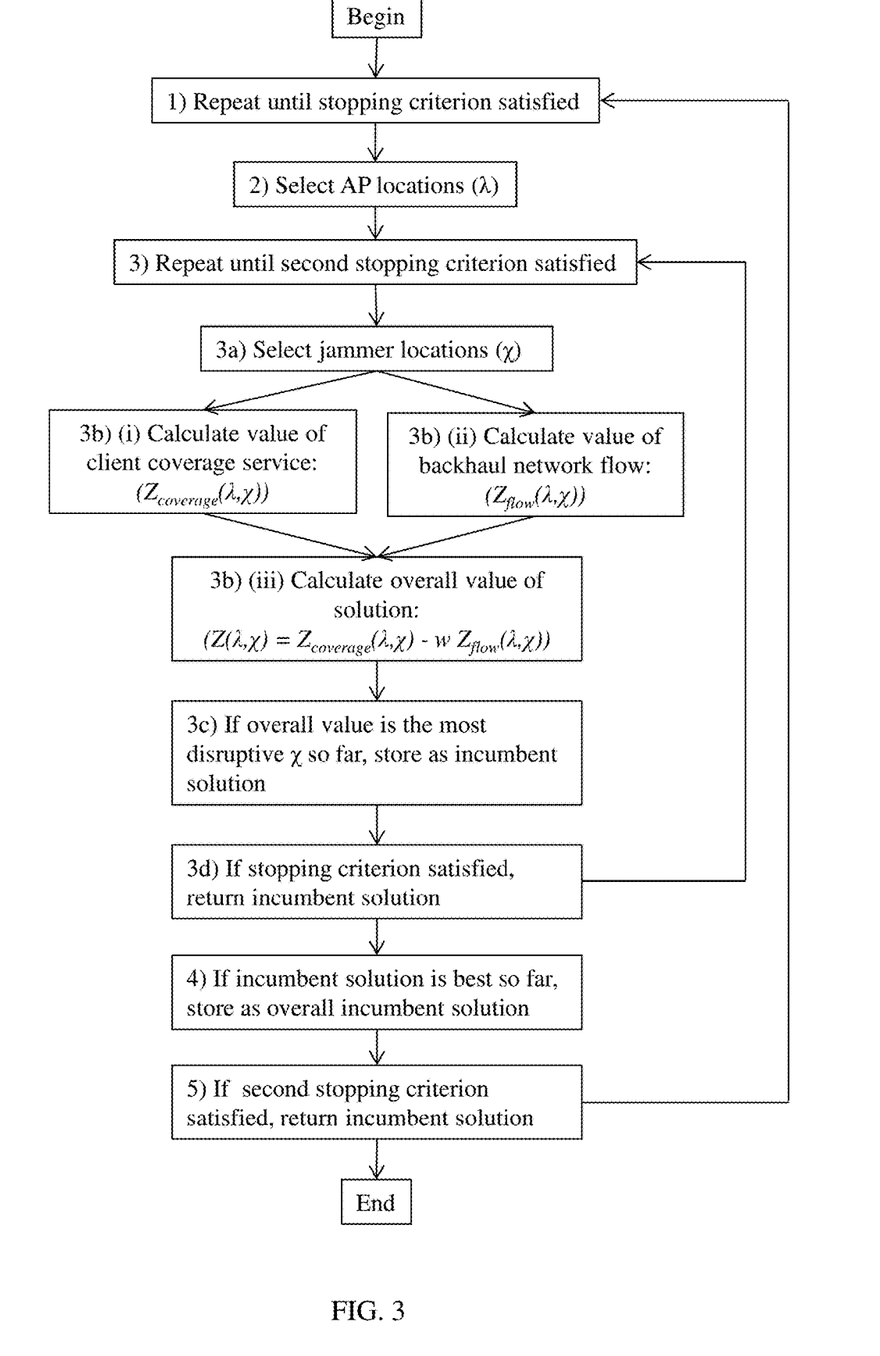
FIG. 3 illustrates the process employed by the computer-based apparatus.

The general process utilized by the computer-based apparatus is presented at FIG. 3. The process has available as input the operating region over the WMN is to be established, the number and operating characteristics of APs and jammers in the operating region, HQ node location, elevation and coverage requirements for each reR, and desired stopping criterion and second stopping criteria. The process commences at BEGIN, and continues through block 1) to block 2) if the stopping criterion is satisfied. At block 2), the process selects an initial set of AP locations $\lambda$, and continues through block 3) to block 3*a*) if a second stopping criterion is satisfied. The process then begins the methodology for finding the most disruptive jammer locations $\chi$ for the current set of AP locations $\lambda$ established at block 2). The process proceeds by selecting a set of jammers locations $\chi$ within the operating region at 3*a*), then quantifying the objective function parameters $Z_{coverage}(\lambda,\chi)$ and $Z_{flow}(\lambda,\chi)$ using the current set of AP locations $\lambda$ and the current set of jammer locations $\chi$ at blocks 3*b*)(i) and 3*b*)(ii) respectively. At block 3*b*)(iii), the process quantifies the objective function $Z(\lambda,\chi)$ using the $Z_{coverage}(\lambda,\chi)$, the $Z_{flow}(\lambda,\chi)$, and the scalar w. At block 3*c*), the quantified $Z(\lambda,\chi)$ just determined at 3*b*)(iii) is compared against previously quantified objective function values for the current set of AP locations $\lambda$, and if the quantified $Z(\lambda,\chi)$ determined at 3*b*)(iii) is the most disruptive jammer configuration $\chi$ encountered thus far for the current set of AP locations $\lambda$, the quantified $Z(\lambda,\chi)$ is established as the incumbent $\chi$ solution. At block 3*d*), the process returns to block 3) and selects a second set of jammers locations $\chi$ at block 3*a*), and evaluates that second set against the current set of AP locations $\lambda$ by performing blocks 3*b*)(i), 3*b*)(ii), 3*b*)(iii), and 3*c*) as before. This inner loop of blocks 3), 3*a*), 3*b*)(i), 3*b*)(ii), 3*b*)(iii), 3*c*) and 3*d*) is repeated for the current set of AP locations $\lambda$ until the second stopping criterion is satisfied. In a particular embodiment, the second stopping criteria is a specified number of iterations of the operations of blocks 3), 3*a*), 3*b*)(i), 3*b*)(ii), 3*b*)(iii), 3*c*), and 3*d*). In another embodiment, the second stopping criteria is based on the difference between quantified objective functions in successive iterations. After conducting the operations of blocks 3), 3*a*), 3*b*)(i), 3*b*)(ii), 3*b*)(iii), 3*c*), and 3*d*) iteratively for the current set of AP locations $\lambda$, the process determines the most disruptive jammer locations $\chi$ for the current set of AP locations $\lambda$ based on the associated quantified objective function.

At the conclusion of the inner loop of blocks 3), 3*a*), 3*b*)(i), 3*b*)(ii), 3*b*)(iii), 3*c*), and 3*d*), at block 4), the resulting incumbent solution for the current set of AP locations $\lambda$ determined at block 3*c*) is compared against all previously determined incumbent solutions based on the respective quantified objective function values, and if the resulting incumbent solution is the best AP configuration encountered thus far for all sets of AP locations $\lambda$ evaluated, the resulting incumbent solution is established as the overall incumbent solution.

At block 5) the process evaluates the stopping criteria, and if the stopping criteria is not satisfied, the process returns to block 1), selects a second set of AP locations $\lambda$ at block 2), and subsequently conducts the inner loop of operations of blocks 3), 3*a*), 3*b*)(i), 3*b*)(ii), 3*b*)(iii), 3*c*), and 3*d*) in order to determine the maximally disruptive jammer locations $\chi$ for the next set of AP locations $\lambda$, before continuing to blocks 4) and 5). This outer loop of blocks commencing at 1) and concluding at 5) is repeated for each set of AP locations $\lambda$, until the stopping criterion is satisfied. In a particular embodiment, the stopping criteria is a specified number of iterations of the operations of blocks 1), 2), 4), and 5). In another embodiment, the stopping criteria is based on the difference between quantified objective functions in successive iterations.

Typically, at block 2), the process selects a subsequent set of AP locations λ by receiving the most disruptive jammer configuration χ which generated the overall incumbent solution, and determining the subsequent set of AP locations λ to be analyzed by finding the set of AP locations λ which is maximally effective in terms of the objective function against the current most disruptive jammer configuration χ, such that, given the most disruptive jammer configuration χ at a given point in the process, the subsequent set of AP locations λ selected at block 2) minimizes coverage shortfall and maximizes delivered backhaul network flow.

The attacker and designer's problems (like the SRRA+C problem) are nondifferentiable, nonconvex, nonlinear optimization problems. The difficulty of finding exact solutions to such problems increases the desirability of using heuristic computational techniques, such as genetic or simulated annealing algorithms, and sampling algorithms, such as mesh adaptive direct search (MADS). In a particular embodiment, the computer-based apparatus utilizes the DIviding RECTangles (DIRECT) algorithm to sample the SRRA+C solution space (i.e., the designer's problem with no jammers) to quickly find solutions. This same approach may be utilized for the attacker's problem $Z_{AD}$ (given fixed AP nodes), and for the designer's problem $Z_{DD}$ (given fixed jammers).

DIRECT is a sampling optimization algorithm based on Lipschitzian optimization The algorithm iteratively samples from the solution space, where the number of dimensions is 2m (attacker's problem) or 2 (n−1) (designer's problem), the length of each dimension is proportional to the operating area length or width, and a single point in the solution space represents the locations of all the nodes being placed (whether AP locations λ in the designer's problem, or jammer locations χ in the attacker's problem). The algorithm progressively samples from and divides the space into smaller hyper-rectangles. At each step, it chooses to explore a particular sub-hyper-rectangle based on both the solution value of the center point and the total volume of the given shape, where larger volumes are more desirable because they indicate greater unexplored territory and hence greater potential for an improved incumbent solution. The DIRECT algorithm is continuous, i.e., it can place APs or jammers at any location within the user-specified operating area. The DIRECT algorithm is guaranteed to eventually converge to the optimum solution, as it will eventually sample within an arbitrary distance of any point in the solution space. See e.g. Jones et al., "Lipschitzian optimization without the Lipschitz constant," *Journal of Optimization Theory and Applications*, 79(1), (1993). For example, the DIRECT algorithm running on a laptop computer quickly finds good solutions to the attacker and designer's problems for networks consisting of up to at least 10 APs where the operating area is discretized into r=6,000 regions.

In an embodiment, the computer-based apparatus utilizes the following pseudo-code for the nested DIRECT algorithm:

Algorithm DIRECT for SRRA+C DAD
Input: Full SRRA problem data (number and operating characteristics of APs and jammers, HQ node location, and elevation and coverage requirements for each r∈R and desired number of iterations max_master_iterations and max_sub_iterations.
Output: Best estimate of optimal AP locations λ*=(λ*$_1$, λ*$_2$, . . . , λ*$_n$) and χ*=(χ*$_1$, χ*$_2$, . . . , χ*$_m$), and operator solution $Z_D(λ*,χ*)$.

```
begin
  Store map data
  Initialize u ← 1
  Master Problem (Designer)
  while (u < max_master_iterations) do
    Calculate AP locations λ_u using DIRECT
    Initialize v ← 1
    Subproblem (Attacker)
    while (v < max_sub_iterations) do
      Calculate EMI locations χ_v using DIRECT
      Solve operator's problem for Z_D for λ_u and χ_v
      if Z_D (λ_u, χ_v) > Z_D (λ_u, χ̂ ) /* If this is the best attack yet,
    store
      as incumbent */
        χ̂ ← χ^k
        Z_D (λ_u, χ̂) ← Z_D (λ_u, χ_v)
      endif;
      v ← v + 1
    end;
    if Z_D (λ_u, χ̂) < Z_D (λ*, χ*) /* If this is the best design yet,
    store
      as incumbent */
        λ* ← λ_u
        χ* ← χ̂
        Z_D (λ*, χ*) ← Z_D (λ_u, χ̂ )
      endif;
      u ← u + 1
  end;
  Return best AP locations λ*, EMI locations χ* , and operator's
  solution
  Z_D (λ*, χ*)
end;
```

For given AP locations $λ_u$ and given enough iterations, DIRECT will eventually find a solution within an arbitrary distance of the solution space point defining the optimal jamming attack.

Quantifying Particular WMN Topologies:

The computer-based apparatus quantifies the value of a particular WMN topology in the presence of EMI by calculating the value of coverage provided to client devices $Z_{coverage}$, and calculating the value of delivered backhaul network flow $Z_{flow}$:

Calculating Client Coverage:

The client coverage provided by a WMN topology is a function of its AP and jammer locations. Given these locations, the computer-based apparatus quantifies the value of client coverage by first calculating the received signal strength (RSS) in Decibel-milliwatts (dBm from each discrete coverage region r∈R from each AP node i or jammer node k (and the reverse path) using the standard link budget formula:

$$RSS = power_{tx} + g_{tx} - l_{tx} - l_{path} - l_{misc} + g_{rx} - l_{rx},$$

where $power_{tx}$ is transmission power in dBm, $g_{tx}$ and $g_{rx}$ are, respectively, the gains of the transmitter and receiver in dBi, $l_{tx}$ and $l_{rx}$ are, respectively, the losses (i.e., from cables, connectors, etc.) of the transmitter and receiver in dB, $l_{path}$ is the total path loss in Decibels (dB), and $l_{misc}$ is the miscellaneous loss (such as fade margin) in dB. See e.g., Olexa, R., *Implementing 802.11, 802.16, and 802.20 wireless networks: Planning, troubleshooting and operations* (2005). Using the standard link budget formula, the computer-based apparatus defines $ρ_{ir}$ ($ρ_{ri}$) as the received signal strength from (to) a transmitting AP node i to (from) coverage region r, and $η_{kr}$ ($η_{ri}$) as the received signal strength from a transmitting jammer node k to coverage region r (AP i). All of the terms in the standard link budget formula are input data, determined by the equipment technical characteristics, except for the total path loss $l_{path}$, which depends on the position of the transmitting device (a client device, AP node $λ_i$, or jammer node $χ_k$)

Various methods may be utilized for computing $l_{path}$, such as a simple inverse-square calculation, the Irregular Terrain Model (ITM), or Hata-COST 231 (COST, 1999). See Longley, A. G., & Rice, P. L. (1968). *Prediction of tropospheric radio transmission loss over irregular terrain. A computer method*-1968 (1968); and see COST (European Cooperation in the Field of Scientific and Technical Research) *Digital mobile radio towards future generation systems: COST* 231 (1999). In an embodiment, the computer-based apparatus utilizes the Terrain Integrated Rough Earth Model (TIREM). This model computes path loss by sampling terrain elevation at fixed points between transmitter and receiver. It considers the effects of free space loss, diffraction, and atmospheric absorption and reflection, but does not consider foliage, buildings, or other nonterrain obstructions. While TIREM is computationally more expensive than simpler models, it provides fairly accurate results.

In an embodiment, to quantify the value of client coverage, the computer-based apparatus calculates in dBm the total interference received at region $r \in R$ and AP node $i \in N$ using:

$$\text{Interference}_r \equiv 10\log_{10}\left(1000 \sum_{k \in M} \frac{10^{\frac{\eta_{kr}}{10}}}{1000}\right) = 10\log_{10} \sum_{k \in M} 10^{\frac{\eta_{kr}}{10}} \quad \forall\, r \in R$$

$$\text{Interference}_i \equiv 10\log_{10}\left(1000 \sum_{k \in M} \frac{10^{\frac{\eta_{ki}}{10}}}{1000}\right) = 10\log_{10} \sum_{k \in M} 10^{\frac{\eta_{ki}}{10}} \quad \forall\, i \in N$$

The computer-based apparatus calculates in dB the signal-to-interference ratio (SIR) $\sigma$ between each region $r \in R$ and AP node $i \in N$. SIR is calculated in both directions (i to r and r to i), as two-way communication is necessary for a client device to successfully exchange traffic with an AP, and terrain, obstructions, and the effects of EMI may cause these quantities to be very different.

(Signal to Interference Ratio)$_{ir} = \sigma_{ir} = \rho_{ir} -$ interference$_r$, $\forall i \in N, \forall r \in R$ (Signal to Interference Ratio)$_{ri} = \sigma_{ri} = \rho_{ri} -$ interference$_i$, $\forall r \in R, \forall i \in N$ The computer-based apparatus defines or receives as input a minimum allowable SIR or sensitivity threshold $\tau$ in dB for each region $r \in R$ and AP node $i \in N$. Higher $\tau$ values indicate a higher priority or a requirement for a higher quality signal and thus greater data transfer rates. In a typical embodiment, the computer-based apparatus uses a value of 10 dB. A positive difference of $\tau$ and $\sigma$ indicates insufficient signal quality. The computer-based apparatus calculates this client coverage shortfall between region r and AP node i and penalizes the weakest component of the bidirectional link between the AP and region (i.e., the link with the greatest coverage shortfall):

$$(\text{Coverage Shortfall})_{ir} \equiv \max_{i \in N, r \in R}((\tau_r - \sigma_{ir})_+, (\tau_i - \sigma_{ri})_+)$$

where ( )+ denotes the projection onto the nonnegative real line. Because a positive difference represents inadequate client coverage, the computer-based apparatus acts to minimize this quantity. In an embodiment, it considers only the minimum coverage shortfall from each AP node $i \in N$ and assumes each client device will connect only to that AP with the strongest available $\sigma_{ir}$. The computer-based apparatus sums over all $r \in R$ to calculate total coverage shortfall, denoted $Z_{coverage}$:

$$Z_{coverage}(\lambda, \chi) =$$
$$(\text{Total Coverage Shortfall}) \equiv \sum_{r \in R} \min_{i \in N}\{\max((\tau_r - \sigma_{ir})_+, (\tau_i - \sigma_{ri})_+)\}$$

The total coverage shortfall is a function of AP node locations $\lambda$ and EMI node locations $\chi$. By allowing only positive terms, this disallows the benefit of transmitting received power to any given coverage region.

Calculating Network Flow:

To assess the value of network flow, arc capacities for the arc paths between each node are calculated. In an embodiment, the computer-based apparatus utilizes the Shannon capacity formula, which establishes a theoretical upper bound on transmission capacity in bits per second (bps), and the capacity from AP node i to j in bps is:

$$(\text{Capacity})_{ij} = \text{bandwidth} \log_2\left(1 + \frac{\text{gain}_{ij}}{\text{interference}_j \text{loss}_{ij}} P_{ij}\right) \forall\, (i, j) \in A$$

where bandwidth is channel bandwidth in Hertz and gain$_{ij}$ is the sum of the antilog gain terms ($g_{tx}$ and $g_{rx}$). Loss$_{ij}$ is the sum of the antilog loss terms ($l_{tx}$, $l_{rx}$, $l_{path}$, and $l_{misc}$) from AP node i to j. Note interference$_j$ is converted to watts with simplified notation for clarity. These input data are calculated by the known locations of AP node locations $\lambda$ and jammer node locations $\chi$. In this embodiment, each AP has limited total transmission power denoted $p_i$ (in watts), and the computer-based apparatus defines $P_{ij}$ to be the fraction of $p_i$ used to transmit from i to j. Thus, each AP is additionally constrained by $$\sum_{j:(i,j) \in A} P_{ij} \le p_i$$

Here, $P_{ij}$ is a decision variable representing the AP-to-AP transmission power from node I to node j, whereas the transmission powers for AP-to-client, jammer-to-client, and jammer-to-AP power$_{tx}$ is a (constant) input parameter.

The computer-based apparatus measures each individual traffic flow in bps and quantifies the value of total network flow according to a log-utility function that places a zero value on unit flow, positive values on flows greater than one, and negative values on flows less than one. Note that a zero flow has an infinite penalty, and therefore there is strong incentive to ensure that each source-destination pair receives some flow. Defining $S_i^d$ to be the total flow originating at node i and destined for node d:

$$(\text{Utility of Total Network Flow}) \equiv \sum_d \sum_{i \ne d} \log_2(S_i^d)$$

Collectively, the computer-based apparatus calculates the value of network flow, denoted $Z_{flow}$. In an embodiment, the computer-based apparatus utilizes a Simultaneous Routing and Resource Allocation (SRRA) technique to calculate $Z_{flow}$ using the relationships and constraints:

SRRA Formulation

Index Use
  i∈N AP node (alias j)
  k∈M jammer node
  (i,j)∈A directed arc (link)
  d∈D⊆N destination node Input Data
  $\hat{\lambda}_i$ locations of AP nodes, $\hat{\lambda}=\{\hat{\lambda}_i, i∈N\}$ [none]
  $\hat{\chi}_k$ locations of jammer nodes, $\hat{\lambda}=\{\hat{\chi}_k, k∈M\}$ [none]
  $p_i$ maximum total transmission power per AP node, i∈N [watts]
  bandwidth channel bandwidth [hertz]

Calculated Data
  $gain_{ij}$ product of analog gain terms from i∈N to j∈N [none]
  $loss_{ij}$ product of analog gain terms from i∈N to j∈N [none]
  $interference_j$ Total received EMI and background noise power
    at j∈N [watts]

Decision Variables
  $S_i^d$ total flow of traffic from origin i∈N to destination d∈D [bps]
  $F_{ij}^d$ traffic flow along arc (i, j)∈A to destination d∈D [bps]
  $T_{ij}$ total flow along arc (i, j)∈A [bps]
  $P_{ij}$ total transmission power along arc (i, j)∈A [watts]

Formulation $$Z_{flow}(\hat{\lambda}, \hat{\chi}) = \max_{S,F,T,P} \sum_d \sum_{i \neq d} \log_2(S_i^d) \qquad (S0)$$

$$\text{s.t.} \sum_{i:(j,i)\in A} F_{ji}^d - \sum_{i:(i,j)\in A} F_{ij}^d = S_j^d \quad \forall j \in N, \forall d \in D \qquad (S1)$$

$$T_{ij} = \sum_d F_{ij}^d \quad \forall (i, j) \in A \qquad (S2)$$

$$T_{ij} - \text{bandwidth} \log_2\left(1 + \frac{gain_{ij}}{interference_j loss_{ij}} P_{ij}\right) \leq 0 \quad \forall (i, j) \in A \qquad (S3)$$

$$\sum_{j:(i,j)\in A} P_{ij} \leq p_i \quad \forall i \in N \qquad (S4)$$

$$S_i^d \geq 0 \, i \neq d \qquad (S5)$$

$$F_{ij}^d \geq 0 \, \forall (i,j) \in A, \forall d \in D \qquad (S6)$$

$$T_{ij} \geq 0 \, \forall (i,j) \in A \qquad (S7)$$

$$P_{ij} \geq 0 \, \forall (i,j) \in A \qquad (S8)$$

Given AP locations $\hat{\lambda}$ and jammer locations $\hat{\chi}$, this is a multicommodity network flow problem. The objective function (S0) maximizes the total utility of traffic flow between each source-destination pair. Constraints (S1) ensure balance of flow at each AP node. Constraints (S2) define the total flow along any arc as the sum of all traffic flows along that arc. Constraints (S3) ensure that total flow along any arc is less than or equal to the arc capacity. Constraints (S4) restrict total transmission power at each AP. Constraints (S5-S8) ensure nonnegativity.

As stated, the overall jammer-cognizant SRRA+C objective function is obtained using a linear combination of client coverage (calculated as client coverage shortfall) and network flow (calculated via the SRRA problem):

$$Z(\hat{\lambda},\hat{\chi})=Z_{coverage}(\hat{\lambda},\hat{\chi})-wZ_{flow}(\hat{\lambda},\hat{\chi}).$$

Here, w is a positive scalar representing the relative importance of network flow. Larger values of w indicate network flow is of greater importance and, in general, increase network flow by valuing more compact network topologies.

Figure 4:
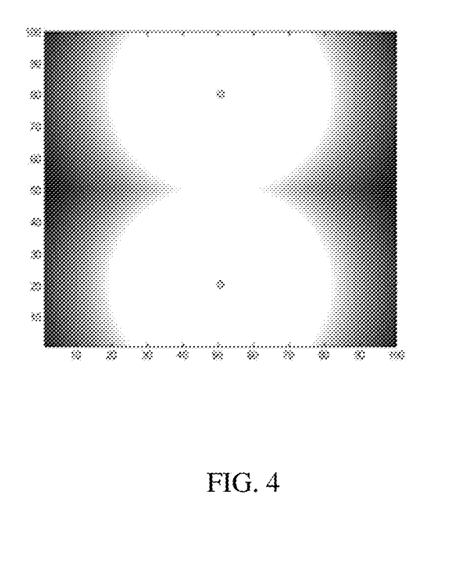
FIG. 4 illustrates a two AP WMN in the absence of jamming.

Exemplary Results:

The attacker's problem is illustrated by finding the optimal single jammer attack against a network of two fixed APs. Consider a one square kilometer operating area (gridded into 100×100 regions) with flat terrain with an AP placed near the top and bottom of the region. This is illustrated at FIG. 4 with no jammer present, where the two APs (depicted as open circles) provide the client coverage shown in white and deliver network traffic to each other at a maximum rate of 419 kilobits per second (kbps). The computer-based apparatus generally penalizes solutions based on the degree of insufficient client coverage, depicted in FIG. 5 as darker areas. In a single-channel jamming attack, the optimal attack is to simply place the single jammer directly on top of either AP, depicted as an "X" on the bottom AP at FIG. 5. This direct-AP attack eliminates the client coverage by the bottom AP, and reduces network traffic flow between the APs to essentially zero. In barrage jamming, the optimal attack is to place the jammer in between the two APs in a between-AP attack, illustrated at FIG. 6. In such a location, the barrage jammer is able to significantly reduce the client coverage provided by both APs, and reduce the delivered network traffic flow to both devices to essentially zero. Because the computer-based apparatus penalizes the degree of coverage shortfall, a jammer in between each AP maximizes this penalty by making the centerline region receive worse client coverage than would be provided if the jammer was placed directly on top of either AP. Likewise, network flow is maximally disrupted in a barrage jamming attack by placing the jammer between each AP because this reduces delivered flow to both APs.

Figure 5:
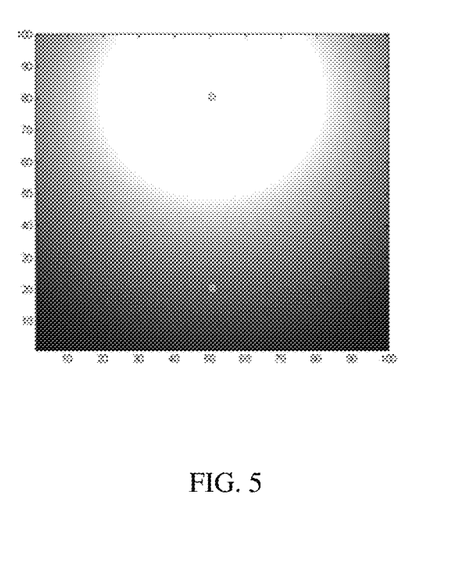
FIG. 5 illustrates a two AP WMN subject to a direct attack.
Figure 6:
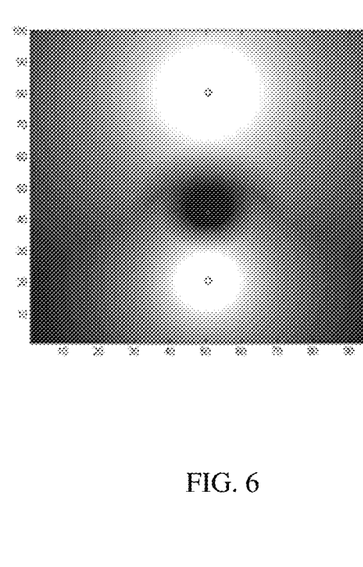
FIG. 6 illustrates a two AP WMN subject to an in-between attack.
Figure 7:
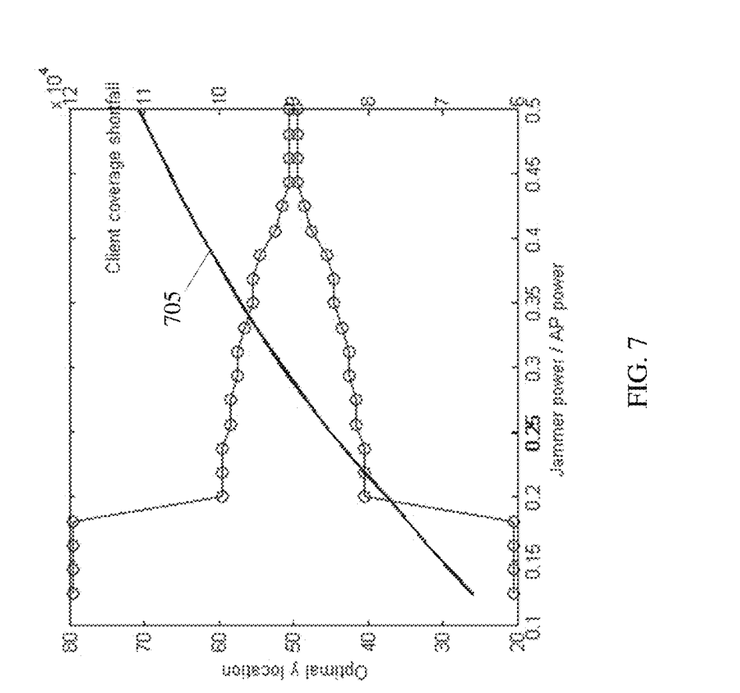
FIG. 7 illustrates the impact of one barrage jammer on client coverage in a 2 AP WMN.
Figure 8:
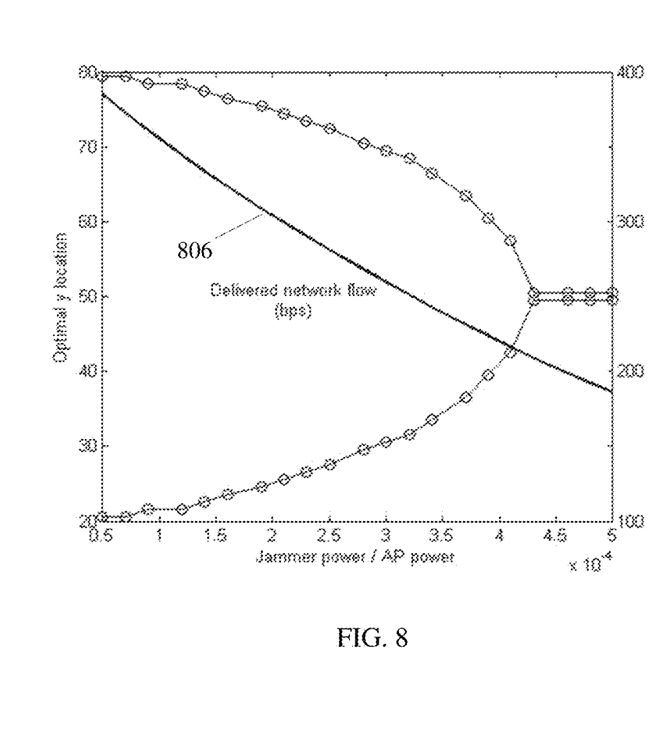
FIG. 8 illustrates the impact of one barrage jammer on network flow in a 2 AP WMN.

FIG. 7 shows the optimal y location(s) for one barrage jammer placed between the two APs at locations (50, 20) and (50, 80) at FIGS. 4-6 to minimize client coverage, as a function of jammer transmission power relative to client device power. The solid line 705 indicates client coverage shortfall. FIG. 8 presents the same analysis for a barrage jammer to minimize backhaul network flow, represented by solid line 806. Equivalent solutions in each figure are shown by two points at a given power ratio. When jamming power relative to AP and client transmission power is low enough, the optimal barrage jamming strategy may become a direct-AP attack. The sudden jump in FIG. 7 is an artifact of continuous client service—which, on perfectly flat terrain, is essentially a circle around each AP—being discretized into the gridded operating area. As the relative transmission power of an AP changes, the "circle" of client coverage around each AP will change in a discontinuous fashion, occasionally jumping in value. In this case, it occurs when the area receiving adequate client service no longer overlaps the upper and lower boundaries of the operating area. The calculation of network flow (i.e., FIG. 8) is not affected by the discretization of the operating area, so these jumps are not present. FIGS. 7 and 8 illustrate that an optimal jamming strategy (i.e., direct-AP or between-AP attack) for attacking client coverage and network flow occurs at different power ratio levels. That is, the best location to place a jammer to maximize client coverage shortfall may not always be the best place to minimize network flow. The best overall location will be a function of w, the positive scalar indicating the value of network flow in the SRRA+C objective function (6).

In the designer's problem, the designer is faced with of finding optimal locations for APs with jammers at fixed locations. While attempting to minimize the effects of jamming, the designer must consider the competing objectives of client coverage and network flow: network flow can be maximized by simply placing the APs as far as possible from the jammers (i.e., on the farthest border of the operating area), but such placement will likely provide very little client coverage. The optimal solution to the designer's problem balances these competing concerns. For example, with a single-channel jammer, the best strategy may be to place the jammed AP far from the jammer and place the unjammed AP near the jammer, maximizing the utility of providing client coverage in the unjammed area. With a barrage jammer, the best strategy may be to move the APs away from the jammer to a point that maximizes client coverage while balancing the competing requirement of network flow. In this scenario, these locations are in the corners of the operating area.

For the full DAD problem, the computer-based apparatus determines the optimal strategy for minimizing the damage caused by the optimal jamming attack. Many variables may affect the optimal solution to the operator's, attacker's, and designer's problems. In these examples, the AP and jammer radio characteristics are modeled on the Cisco Aironet 1550 WMN AP, and client devices are modeled on a generic internal 802.11n wireless interface card. Results for two exemplary situations are presented at FIGS. 9-14 in a tri-panel format, where the left panel (FIGS. 9 and 12) depicts the best unjammed solution found (i.e., the designer's problem without jammers); the middle panel (FIGS. 10 and 13) depicts the best undefended solution found when the attacker now jams the unjammed solution (i.e., the solution to the attacker's problem (3)); and the right panel (FIGS. 11 and 14) depicts the best defended solution found when the designer chooses that network topology which minimizes the effects of the best jamming attack found (i.e., the DAD solution (5)). In these examples, the computer-based apparatus utilizes the nested DIRECT optimization, which samples many different jamming attacks for many different network designs. For each solution panel, the thickness of the lines between APs is directly proportional to delivered network flow. The computer-based apparatus runs DIRECT until the solution objective values have not changed significantly for more than 10 function evaluations, or 20 master and subproblem iterations of DIRECT (whichever occurs first).

Figure 9:
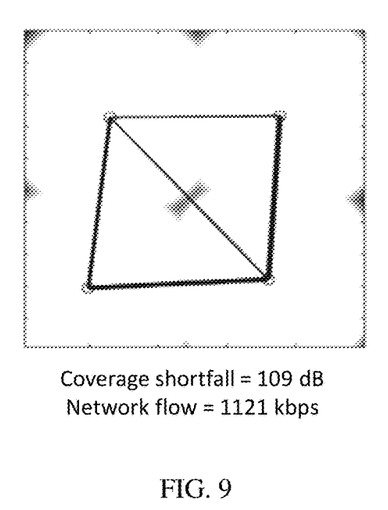
FIG. 9 illustrates a WMN in a first operating area in the absence of a jamming attack.
Figure 10:
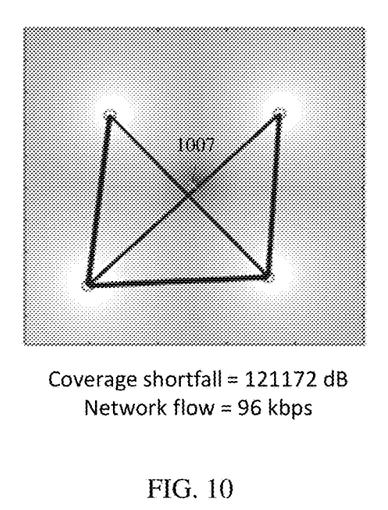
FIG. 10 illustrates the WMN in the first operating area subject to a jamming attack.
Figure 11:
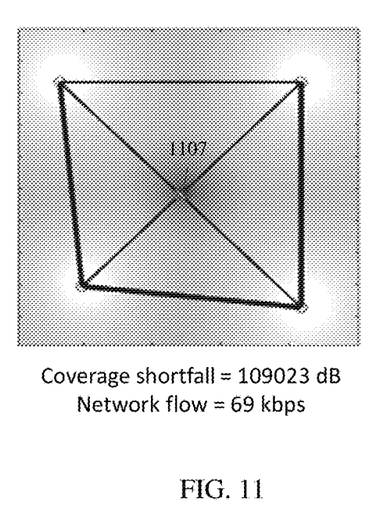
FIG. 11 illustrates the WMN in the first operating area subject to a maximally disruptive jamming attack.

FIGS. 9, 10, and 11 illustrate the operations of the computer-based apparatus with a network of four APs being attacked by one barrage jammer, with the fixed HQ node located in the lower left of the operating area. At FIGS. 9, 10, and 11, APs are shown as circles. At FIG. 9, the designer places four APs to cover most of the operating area. Given this fixed design, at FIG. 10, the attacker places a barrage jammer 1007 in the middle of the operating area, greatly increasing client coverage shortfall and decreasing total delivered network flow. Finally, at FIG. 11, the designer chooses a more dispersed network topology that minimizes the damage of the worst attack (generated by barrage jammer 1107), generating reduced client coverage shortfall.

Figure 12:
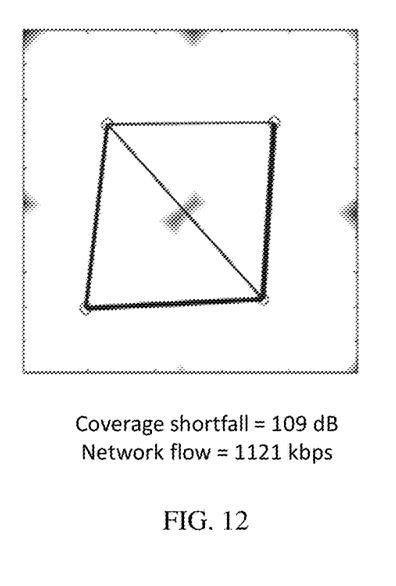
FIG. 12 illustrates a WMN in a second operating area in the absence of a jamming attack.
Figure 13:
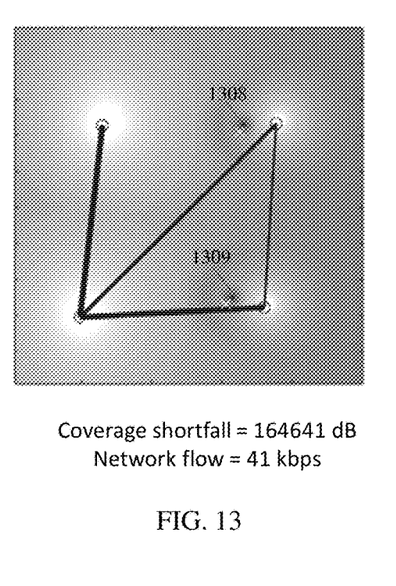
FIG. 13 illustrates the WMN in the second operating area subject to a jamming attack.
Figure 14:
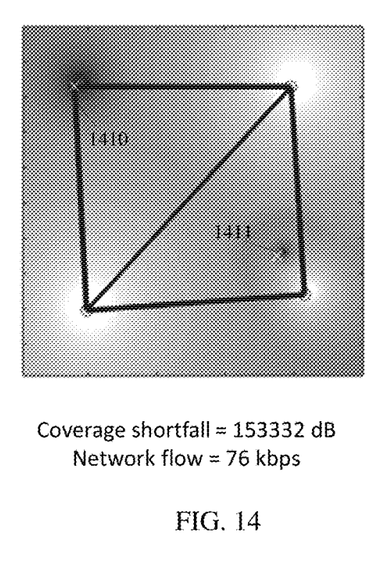
FIG. 14 illustrates the WMN in the second operating area subject to a maximally disruptive jamming attack.

FIGS. 12, 13, and 14 illustrate a similar progression of the computer-based apparatus with a network of four APs being attacked by two barrage jammers. At FIG. 12, the designer has placed four APs to cover most of the operating area. At FIG. 13, the attacker now places barrage jammers 1308 and 1309 each near an AP, rather than directly between the APs. In the DAD solution at FIG. 14, the designer again chooses an AP topology that minimizes the effectiveness of a between-AP attack. The DAD solution decreases coverage shortfall and increases network flow over the undefended solution.

Thus, provided here is a computer-implemented system for establishing a wireless mesh network resistant to degradation induced by deliberate jamming or other electromagnetic interference emanating from point sources within an operating area. The computer-implemented system provides WMN AP locations that minimize disruptions to client coverage caused by jammers, subject to constraints on network service. The computer-implemented system considers jammers placed by an intelligent adversary and identifies the AP locations $\lambda$ through quantification of an objective function of the general form $Z(\lambda,\chi)=Z_{coverage}(\lambda,\chi)-w Z_{flow}(\lambda,\chi)$, where $Z_{coverage}(\lambda,\chi)$ reflects resulting coverage shortfall, $Z_{flow}(\lambda,\chi)$ reflects traffic flow within the WMN, and w is a scalar reflecting the relative weight of the two terms. The final set of AP locations $\lambda$ identifies the locations of APs to create a WMN that is the most robust to potential degradation induced by deliberate jamming or other electromagnetic interference (EMI) emanating from point sources within an operating area.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A computer-implemented system for forming a wireless mesh network comprising:
   a plurality of wireless access points comprising the wireless mesh network, where each wireless access point comprises a radio and a power source, and where each wireless access point is located on one AP location comprising a final plurality of access point locations, where the one AP location is a location on a geographic area and where the one AP location is associated with a two-dimensional coordinate (x,y) describing the location on the geographic area, and at least one wireless access point in radio communication with at least one other wireless access point; and
   a computer-based apparatus comprising non-transitory computer readable code for a method of determining the final plurality of access point locations when implemented by the computer-based apparatus, the method comprising:
      receiving an input of an operating-region where the input of the operating region comprises a two-dimensional topographic area representing the geographic area;

dividing the operating region into a set of discrete coverage regions; and locating access points on the operating region by, (a) generating a plurality of access point locations where each access point location is a single location on the operating region, (b) defining a plurality of arc paths, where the plurality of arcs paths includes an arc path from every access point location in the plurality of access point locations to every other access point location in the plurality of access point locations, such that every arc path originates at a first access point and terminates at a second access point, (c) generating a plurality of jammer locations where each jammer location is an individual location on the operating region, (c)(1) quantifying a client coverage $Z_{coverage}(\lambda,\chi)$ for the plurality of access point locations and the plurality of jammer locations, where the client coverage $Z_{coverage}(\lambda,\chi)$ determines a coverage shortfall for each discrete coverage region in the set of discrete coverage regions by comparing a received signal strength from every access point location in the plurality of access point locations to the each discrete coverage region, an interference from every jammer location in the plurality of jammer locations to the each discrete coverage region, and a minimum coverage threshold for the each discrete coverage region, and where the client coverage $Z_{coverage}(\lambda,\chi)$ provides a summation over all discrete coverage regions in the set of discrete coverage regions, thereby generating a quantified $Z_{coverage}(\lambda,\chi)$, (c)(2) quantifying a network flow $Z_{flow}(\lambda,\chi)$ for the plurality of access point locations and the plurality of jammer locations, where the network flow $Z_{flow}(\lambda,\chi)$ determines a total flow of traffic through each access point location in the plurality of access point locations based on a transmission power at every access point location in the plurality of access point locations and an arc capacity for every arc path in the plurality of arc paths which originates or terminates at the each access point location, and where the network flow $Z_{flow}(\lambda,\chi)$ provides a summation over all access point locations in the plurality of access point locations, thereby generating a quantified $Z_{flow}(\lambda,\chi)$, (c)(3) generating a quantified objective function $Z(\lambda,\chi)$ using the quantified client coverage $Z_{coverage}(\lambda,\chi)$ and the negative of the quantified network flow $Z_{flow}(\lambda,\chi)$, (c)(4) determining if a stopping criterion is met, and wherein if the stopping criterion is not met, generating a second plurality of jammer locations and repeating operations (c)(1), (c)(2), and (c)(3) using the second plurality of jammer locations as the plurality of jammer locations, and wherein if the stopping criterion is met, selecting a maximum value among the quantified objective functions $Z(\lambda,\chi)$ generated for the plurality of access point locations, designating the maximum value of the quantified objective functions $Z(\lambda,\chi)$ generated for the plurality of access point locations as a benchmark objective function $Z(\lambda,\chi)$, and associating the benchmark objective function $Z(\lambda,\chi)$ with the plurality of access point locations, (d) determining if a second stopping criterion is met, and wherein if the second stopping criterion is not met, generating a second plurality of access point locations and repeating operations (b), (c), (c)(1), (c)(2), (c)(3), and (c)(4) using the second plurality of access point locations as the plurality of access point locations, and wherein if the second stopping criteria is met, selecting a minimum value among the benchmark objective functions $Z(\lambda,\chi)$ and establishing the plurality of access point locations associated with the minimum value of the benchmark objective functions $Z(\lambda,\chi)$ as the final plurality of access point locations, and providing as output the final plurality of access point locations.

2. The computer-implemented system of claim 1 where the quantified objective function $Z(\lambda,\chi)$ is determined by:

$$Z(\lambda,\chi)=Z_{coverage}(\lambda,\chi)-wZ_{flow},$$

where $Z(\lambda,\chi)$ is the quantified objective function $Z(\lambda,\chi)$, $Z_{coverage}(\lambda,\chi)$ is the quantified client coverage $Z_{coverage}(\lambda,\chi)$, w is a positive scalar, and $Z_{flow}$ is the quantified network flow $Z_{flow}(\lambda,\chi)$.

3. The computer-implemented system of claim 2 where the client coverage $Z_{coverage}(\lambda,\chi)$ compares the received signal strength from every access point location in the plurality of access point locations to each discrete coverage region, the interference from every jammer location in the plurality of jammer locations to the each discrete coverage region, and the minimum coverage threshold for the each discrete coverage region by:

determining a signal-to-interference ratio for the each discrete coverage region according to $\sigma=\rho-I$, where $\rho$ is the received signal strength from every access point location in the plurality of access point locations to the each discrete coverage region, I is the interference from every jammer location in the plurality of jammer locations to the each discrete coverage region, and $\sigma$ is the signal-to-interference ratio for the each discrete coverage region; and determining a coverage shortfall for the each discrete coverage region according to $CS=\tau-\sigma$, where $\tau$ is the minimum coverage threshold for the each discrete coverage region and CS is the coverage shortfall for the each discrete coverage region.

4. The computer-implemented system of claim 2 where the network flow $Z_{flow}(\lambda,\chi)$ determines the total flow of traffic through each access point location in the plurality of access point locations by determining an $F_j$ for the each access point location, where the $F_j$ is a traffic flow through every arc path in the plurality of arc paths which originates or terminates at the each access point location, and where $F_j$ is dependent on at least the transmission power at every access point location in the plurality of access point locations and the arc capacity for every arc path in the plurality of arc paths which originates or terminates at the each access point location.

5. The computer-implemented system of claim 1 where the computer-based apparatus selects the second plurality of access point locations by:

identifying a specific plurality of jammer locations, where the specific plurality of jammer locations is the plurality of jammer locations which generated the benchmark objective function $Z(\lambda,\chi)$;

defining multiple pluralities of interim access point locations, where every plurality of interim access point locations in the multiple pluralities of interim access point locations is a plurality of individual locations on the operating region;

performing, operation (b), operation (c)(1), operation (c)(2), and operation (c)(3) of claim 1 for each plurality of interim access point locations in the multiple pluralities of interim access point locations by using the each plurality of interim access point locations as the plurality of access point locations and using the specific plurality of jammer locations as the plurality of jammer locations, thereby generating an interim quantified objective function $Z(\lambda,\chi)$ for the each plurality of interim access point locations, where the interim quantified objective function $Z(\lambda,\chi)$ for the each plurality of interim access point locations is the quantified objective function $Z(\lambda,\chi)$ of operation (c)(3) of claim 1;

identifying a minimum interim objective function $Z(\lambda,\chi)$ among the interim quantified objective functions $Z(\lambda,\chi)$; and identifying the second plurality of access point locations, where the second plurality of access point locations is the plurality of interim access point locations which generated the minimum interim objective function $Z(\lambda,\chi)$ among the interim quantified objective functions $Z(\lambda,\chi)$.

6. The computer-implemented system of claim 1 further comprising a two-dimensional display in data communication with the computer-based apparatus, where the two-dimensional display receives the input of the operating region from the computer-based apparatus and displays the two-dimensional topographic area, and where the two-dimensional display receives the output of the computer-based apparatus and displays the final plurality of access point locations on the two-dimensional topographic area.

7. The computer-implemented system of claim 6 where the two-dimensional display further receives the set of discrete coverage regions from the computer-based apparatus and the coverage shortfall for every discrete coverage region in the set of discrete coverage regions from the computer-based apparatus, and further displays the set of discrete coverage regions and the coverage shortfall for every discrete coverage region on the two-dimensional topographic area.

8. The computer-implemented system of claim 1 where the stopping criterion is a selected number of iterations of operations (c)(1), (c)(2), (c)(3), and (c)(4).

9. The computer-implemented system of claim 1 where the stopping criterion is a maximum elapsed time allowed for the computer-based apparatus to iteratively conduct operations (c)(1), (c)(2), (c)(3), and (c)(4).

10. The computer-implemented system of claim 1 where the stopping criterion is a minimum difference between the quantified objective function $Z(\lambda,\chi)$ for the plurality of jammer locations and the quantified objective function $Z(\lambda,\chi)$ for the second plurality of jammer locations.

11. A computer-implemented system for forming a wireless mesh network where the wireless mesh network includes a plurality of access points arranged to provide radio communications with a plurality of client devices comprising:

a plurality of wireless access points comprising the wireless mesh network, where each wireless access point comprises a radio and a power source, and where each wireless access point is located on one AP location comprising a final plurality of access point locations, where the one AP location is a location on a geographic area and where the one AP location is associated with a two-dimensional coordinate (x,y) describing the location on the geographic area, and at least one wireless access point in radio communication with at least one other wireless access point; and a computer-based apparatus including non-transitory computer readable code for a method of determining the final plurality of access point locations when implemented by the computer-based apparatus, the method comprising:

receiving an input of an operating region where the input of the operating region comprises a two-dimensional topographic area representing the geographic area;

dividing the operating region into a set of discrete coverage regions;

establishing a minimum coverage threshold $\tau$ for each coverage region in the set of discrete coverage regions;

defining an objective function $Z(\lambda,\chi)$ by, defining a measure of access point locations, where the measure of access point locations is defined as a set of $\lambda$, where the set of $\lambda$ comprises a plurality of $\lambda_i$ where i is an integer from 1 to n and n is an integer greater than or equal to i and greater than 1, and where each $\lambda_i$ is a single access point location on the operating region, defining a measure of jammer locations, where the measure of jammer locations is defined as a set of $\chi$, where the set of $\chi$ comprises a plurality of $\chi_k$ where k is an integer from 1 to m and m is an integer greater than or equal to k, greater than 1, and less than n, and where each $\chi_k$ in the set of $\chi$ is a single jammer location on the operating region, defining a measure of client coverage $Z_{coverage}(\lambda,\chi)$, where the measure of client coverage $Z_{coverage}(\lambda,\chi)$ includes a sensitivity threshold for each coverage region, where the sensitivity threshold reflects a signal-to-interference ratio $\sigma$ for the each coverage region subtracted from the minimum coverage threshold $\tau$ for the each coverage region, where the signal-to-interference ratio $\sigma$ for the each coverage region is determined by a received signal strength and an interference, where received signal strength comprises a transmission power from every $\lambda_i$ comprising the set of $\lambda$ to the each coverage region, and the interference comprises a transmission power from every $\chi_k$ comprising the set of $\chi$ to the each coverage region, and where the measure of client coverage $Z_{coverage}(\lambda,\chi)$ provides a summation over all discrete coverage regions in the set of discrete coverage regions, defining a measure of arc paths, where the measure of arc paths is a plurality of arcs (i,j), where each arc (i,j) represents a communication path, and where the plurality of arcs (i,j) includes an arc (i,j) from every $\lambda_i$ comprising the set of $\lambda$ to every other $\lambda_j$ comprising the set of $\lambda$, defining a measure of network flow $Z_{flow}(\lambda,\chi)$, where the measure of network flow $Z_{flow}(\lambda,\chi)$ includes, for each $\lambda_i$ comprising the set of $\lambda$, an $S_i^d$ for the each $\lambda_i$, and, for each arc (i,j) in the plurality of arcs (i,j), an $F_{ij}^d$ for the each arc (i,j), a $T_{ij}$ for the each arc (i,j), and a $P_{ij}$ for the each arc (i,j), where the $S_i^d$ for the each $\lambda_i$ is a total flow of traffic from the each $\lambda_i$, the $F_{ij}^d$ for the each arc (i,j) is a traffic flow for the each arc (i,j), the $T_{ij}$ for the each arc (i,j) is a total flow for the each arc (i,j), and the $P_{ij}$ for the each arc (i,j) is a total transmission power for the each arc (i,j), and where the measure of network flow $Z_{flow}$ ($\lambda,\chi$) provides a summation over all $\lambda_i$ comprising the set of $\lambda$ and, defining the objective function $Z(\lambda,\chi)$ as $Z(\lambda,\chi) = Z_{coverage}(\lambda,\chi) - w\, Z_{flow}$, where $Z(\lambda,\chi)$ is the objective function $Z(\lambda,\chi)$, $Z_{coverage}(\lambda,\chi)$ is the measure of client coverage $Z_{coverage}(\lambda,\chi)$, w is a positive scalar, and $Z_{flow}$ is the measure of network flow $Z_{flow}(\lambda,\chi)$;

locating access points on the operating region by,
- (a) generating a trial set of $\lambda$ by quantifying the measure of access point locations by assigning an individual location on the operating region to each $\lambda_i$ in the set of $\lambda$, thereby generating the trial set of $\lambda$,
- (b) generating a trial set of $\chi$ for the trial set of $\lambda$ by quantifying the measure of jammer locations by assigning a specific location on the operating region to each $\chi_k$ in the set of $\chi$,
- (b)(1) calculating a value of the objective function $Z(\lambda,\chi)$ by quantifying the measure of client coverage $Z_{coverage}(\lambda,\chi)$ and the measure of network flow $Z_{flow}(\lambda,\chi)$ using the trial set of $\lambda$ as the set of $\lambda$ and the trial set of $\chi$ as the set of $\chi$, and by quantifying the scalar w;
- (b)(2) storing the value of the objective function $Z(\lambda,\chi)$ and,
- (b)(3) determining if a stopping criterion is met, and wherein if the stopping criterion is not met, repeating operations (b), (b)(1), and (b)(2), and wherein if the stopping criterion is met, selecting the maximum value among the quantified objective functions $Z(\lambda,\chi)$ calculated for the trial set of $\lambda$, designating the maximum value of the quantified objective function $Z(\lambda,\chi)$ generated for trial set of $\lambda$ as a benchmark objective function $Z(\lambda,\chi)$, and associating the benchmark objective function $Z(\lambda,\chi)$ with the trial set of $\lambda$,
- (c) determining if a second stopping criterion is met, and wherein if the second stopping criterion is not met, repeating operations (a), (b), (b)(1), (b)(2), and (b)(3), and wherein if the second stopping criteria is met, selecting the minimum value among the benchmark objective functions $Z(\lambda,\chi)$ and establishing the trial set of $\lambda$ associated with the minimum value among the benchmark objective functions $Z(\lambda,\chi)$ as the final plurality of access point locations, and providing as output the final plurality of access point locations.

12. The computer-implemented system of claim 11 further comprising a two-dimensional display in data communication with the computer-based apparatus, where the two-dimensional display receives the input of the operating region from the computer-based apparatus and displays the two-dimensional topographic area, and where the two-dimensional display receives the output of the computer-based apparatus and displays the final plurality of access point locations on the two-dimensional topographic area.

13. The computer-implemented system of claim 12 where the two-dimensional display further receives the set of discrete coverage regions from the computer-based apparatus and the sensitivity threshold for every discrete coverage region in the set of discrete coverage regions from the computer-based apparatus, and further displays the set of discrete coverage regions and the sensitivity threshold for every discrete coverage region on the two-dimensional topographic area.

14. The computer-implemented system of claim 11 where the stopping criterion is a selected number of iterations of operations (b), (b)(1), (b)(2), and (b)(3).

15. The computer-implemented system of claim 11 where the stopping criterion is a maximum elapsed time allowed for the computer-based apparatus to iteratively conduct (b), (b)(1), (b)(2), and (b)(3).

16. The computer-implemented system of claim 11 where the stopping criterion is a minimum difference between successive values of the objective function $Z(\lambda,\chi)$.

* * * * *